(12) United States Patent
Han

(10) Patent No.: US 10,692,110 B2
(45) Date of Patent: Jun. 23, 2020

(54) TERMINAL APPARATUS AND OPERATION METHOD THEREFOR

(71) Applicants: Eleven Street Co., Ltd., Seoul (KR); SK Planet Co., Ltd., Seongnam-si (KR)

(72) Inventor: Min Ho Han, Seoul (KR)

(73) Assignees: Eleven Street Co., Ltd., Seoul (KR); SK Planet Co., Ltd., Seongnam-si (KR)

(*) Notice: Subject to any disclaimer, the term of this patent is extended or adjusted under 35 U.S.C. 154(b) by 376 days.

(21) Appl. No.: 15/321,534

(22) PCT Filed: Dec. 9, 2015

(86) PCT No.: PCT/KR2015/013414
§ 371 (c)(1),
(2) Date: Dec. 22, 2016

(87) PCT Pub. No.: WO2016/126001
PCT Pub. Date: Aug. 11, 2016

(65) Prior Publication Data
US 2017/0161785 A1    Jun. 8, 2017

(30) Foreign Application Priority Data

Feb. 2, 2015  (KR) .................. 10-2015-0016215

(51) Int. Cl.
*G06Q 30/00* (2012.01)
*G06Q 30/02* (2012.01)
(Continued)

(52) U.S. Cl.
CPC ......... *G06Q 30/0267* (2013.01); *G06Q 30/02* (2013.01); *G06Q 30/0241* (2013.01);
(Continued)

(58) Field of Classification Search
CPC .............. G06Q 30/0267; G06Q 30/02; G06Q 30/0241; H04W 4/21; H04B 1/3833; H04L 67/02
(Continued)

(56) References Cited

U.S. PATENT DOCUMENTS 9,065,819 B1* 6/2015 Shanmugam ....... H04L 63/0815
2012/0096366 A1* 4/2012 Narla ...................... H04W 4/18
715/744
(Continued)

FOREIGN PATENT DOCUMENTS

JP   2012-133780 A   7/2012
JP   2014-513353 A   5/2014
(Continued)

OTHER PUBLICATIONS

International Search Report for PCT/KR2015/013414 dated Mar. 31, 2016, citing the above reference(s).

*Primary Examiner* — Luis A Brown
(74) *Attorney, Agent, or Firm* — Fenwick & West LLP

(57) ABSTRACT

Disclosed herein are a terminal and an operation method for the same which allow an advertisement platform apparatus to share the advertisement selection information independently collected and managed for each advertisement medium in relation to the terminal by matching terminal identification information that is issued differently for each advertisement medium in providing an advertisement selected based on the terminal identification information issued to the terminal.

7 Claims, 7 Drawing Sheets

(51) Int. Cl.
*H04W 4/21* (2018.01)
*H04B 1/3827* (2015.01)
*H04L 29/08* (2006.01)

(52) U.S. Cl.
CPC ............ *H04B 1/3833* (2013.01); *H04W 4/21* (2018.02); *H04L 67/02* (2013.01)

(58) Field of Classification Search
USPC .................................. 705/14.4, 14.64, 14.72
See application file for complete search history.

(56) References Cited

U.S. PATENT DOCUMENTS

| | | | | |
|---|---|---|---|---|
| 2012/0226970 A1* | 9/2012 | Porter | ....................... | G06F 8/38 715/234 |
| 2012/0278186 A1* | 11/2012 | Hayton | .............. | G06Q 30/0214 705/14.73 |
| 2013/0198300 A1* | 8/2013 | Briggman | ............... | H04L 51/22 709/206 |
| 2014/0130182 A1* | 5/2014 | Yackanich | .............. | G06F 21/60 726/27 |
| 2014/0297371 A1* | 10/2014 | Colburn | .................. | G07C 1/10 705/7.38 |
| 2014/0359001 A1* | 12/2014 | Dupoteau | ............... | H04L 67/02 709/203 |
| 2015/0074649 A1* | 3/2015 | Lee | ..................... | G06F 11/3688 717/124 |
| 2015/0082450 A1* | 3/2015 | Callmin | .................. | G06Q 30/02 726/26 |
| 2015/0135198 A1* | 5/2015 | Pack, III | ................. | G06F 9/542 719/318 |
| 2015/0215299 A1* | 7/2015 | Burch | .................... | H04L 63/08 726/5 |
| 2015/0373056 A1* | 12/2015 | Bouthemy | ......... | H04L 65/1006 709/203 |

FOREIGN PATENT DOCUMENTS

| | | |
|---|---|---|
| KR | 10-2013-0058459 A | 6/2013 |
| KR | 10-2014-0024542 A | 3/2014 |
| KR | 10-1439928 B1 | 9/2014 |

\* cited by examiner

FIG. 6

| FIRST TERMINAL IDENTIFICATION INFORMATION (APPLICATION) | SECOND TERMINAL IDENTIFICATION INFORMATION (WEB) |
|---|---|
| A1 | W1, W2 |
| A2 | W5, W6 |
| A3 | W7, W8 |

TERMINAL APPARATUS AND OPERATION METHOD THEREFOR

CROSS REFERENCE TO RELATED APPLICATION

This present application is a national stage filing under 35 U.S.C § 371 of PCT application number PCT/KR2015/013414 filed on Dec. 9, 2015 which is based upon and claims the benefit of priority to Korean Patent Application No. 10-2015-0016215, filed on Feb. 2, 2015, which is hereby incorporated by reference herein in its entirety.

TECHNICAL FIELD

The present disclosure relates to a method of matching terminal identification information, which is differently issued for each advertisement medium, in relation to providing an advertisement selected based on terminal identification information issued to a terminal.

BACKGROUND ART

As the market for applications running on mobile devices such as smartphones and tablet pads is rapidly expanding, the related advertising market is rapidly expanding.

In this regard, a mobile device (hereinafter, a "terminal") receives and displays an advertisement provided from an advertisement platform apparatus when an application is executed or when a service page (e.g., a web page) is accessed as an advertisement medium.

At this time, the advertisement platform apparatus may collect various history information (e.g., a history of selection of advertisements on an application or a service page, an application execution log, a service page access log, service usage history information, and the like) in the terminal and utilize the same as advertisement selection information for selecting a target advertisement for the terminal.

As mentioned above, an advertisement medium that enables the terminal to receive advertisements is divided into an application executed in the terminal itself and a service page which the terminal may access by calling a browser. In general, the advertisement selection information is independently collected and managed for each advertisement medium.

Thereby, according to the conventional technology, advertisement selection information cannot be shared among advertisement media, and which may be expected to serve as an obstacle in providing high quality target advertisements.

DISCLOSURE

Technical Problem

The present disclosure has been made in view of the above issues, and it is an object of the present disclosure to match terminal identification information that is issued differently for each advertisement medium to a terminal in relation to providing an advertisement selected based on the terminal identification information issued to the terminal, such that the advertisement selection information which is collected and managed independently for each advertisement medium is shared and used in relation to the terminal.

Technical Solution

In accordance with one aspect of the present invention, a terminal includes a first advertisement unit using first terminal identification information, a second advertisement unit using second terminal identification information independent of the first advertisement unit, a determination unit for determining whether an interface exists between the first advertisement unit and the second advertisement unit, and a controller causing the first advertisement unit or the second advertisement unit to transmit the first terminal identification information and the second terminal identification information to an identification information management apparatus according to a result of the determination thereby the first terminal identification information and the second terminal identification information being able to be matched by the identification information management apparatus.

More specifically, when the first advertisement unit is an application executed in the terminal and the second advertisement unit is a browser provided in the application, the determination unit may determine that the interface exists between the application and the browser.

More specifically, when the interface exists between the application and the browser, the controller may cause the application to receive the second terminal identification information from the browser via the interface and to transmit the first terminal identification information and the second terminal identification information to the identification information management apparatus.

More specifically, when the first advertisement unit is an application executed in the terminal and the second advertisement unit is a browser provided by the terminal irrespective of the application, the determination unit may determine that the interface does not exist between the application and the browser.

More specifically, when the interface does not exist between the application and the browser, the controller may cause the application to insert the first terminal identification information into access address information of a service apparatus connected through the browser and transmit the inserted first terminal identification information to the browser, and cause the browser to transmit the first terminal identification information inserted into the access address information and the second terminal identification information to the identification information management apparatus.

More specifically, when the first terminal identification information and the second terminal identification information transmitted to the identification information management apparatus match the first terminal identification information or the second terminal identification information, the first advertisement unit and the second advertisement unit may transmit the matching first terminal identification information or second terminal identification information to an advertisement platform apparatus and receive, from the advertisement platform apparatus, an advertisement selected based on the first terminal identification information or the second terminal identification information.

In accordance with one aspect of the present invention, a method of operating a terminal having a first advertisement unit using first terminal identification information and a second advertisement unit using second terminal identification information independent of the first advertisement unit includes a determination step of determining whether an interface exists between the first advertisement unit and the second advertisement unit, and a control step of causing the first advertisement unit or the second advertisement unit to transmit the first terminal identification information and the second terminal identification information to an identification information management apparatus according to a result of the determination thereby the first terminal identification information and the second terminal identification information being able to be matched by the identification information management apparatus.

More specifically, the determination step may include determining, when the first advertisement unit is an application executed in the terminal and the second advertisement unit is a browser provided in the application that (, which) the interface exists between the application and the browser.

More specifically, the control step may include when the interface exists between the application and the browser, causing the application to receive the second terminal identification information from the browser via the interface and to transmit the first terminal identification information and the second terminal identification information to the identification information management apparatus. More specifically, the determination step may include determining, when the first advertisement unit is an application executed in the terminal and the second advertisement unit is a browser provided by the terminal irrespective of the application, that the interface does not exist between the application and the browser.

More specifically, the control step may include when the interface does not exist between the application and the browser, causing the application to insert the first terminal identification information into access address information of a service apparatus connected through the browser and transmit the inserted first terminal identification information to the browser, and causes the browser to transmit the first terminal identification information inserted into the access address information and the second terminal identification information to the identification information management apparatus.

More specifically, the method may further include when the first terminal identification information and the second terminal identification information transmitted to the identification information management apparatus match the first terminal identification information or the second terminal identification information, the first advertisement unit and the second advertisement unit transmitting the matching first terminal identification information or second terminal identification information to an advertisement platform apparatus and receiving, from the advertisement platform apparatus, an advertisement selected based on the first terminal identification information or the second terminal identification information.

Advantageous Effects

According to a terminal and an operation method for the same of the present disclosure, in relation to providing an advertisement selected based on terminal identification information issued to the terminal, terminal identification information that is issued differently for each advertisement medium is matched to each other. Thereby, the advertisement platform apparatus can share the advertisement selection information independently collected and managed for each advertisement medium with respect to the terminal.

DESCRIPTION OF DRAWINGS

FIG. 6 is an exemplary diagram for explaining a method of changing terminal identification information according to an embodiment of the present disclosure.

BEST MODE

Figure 1:
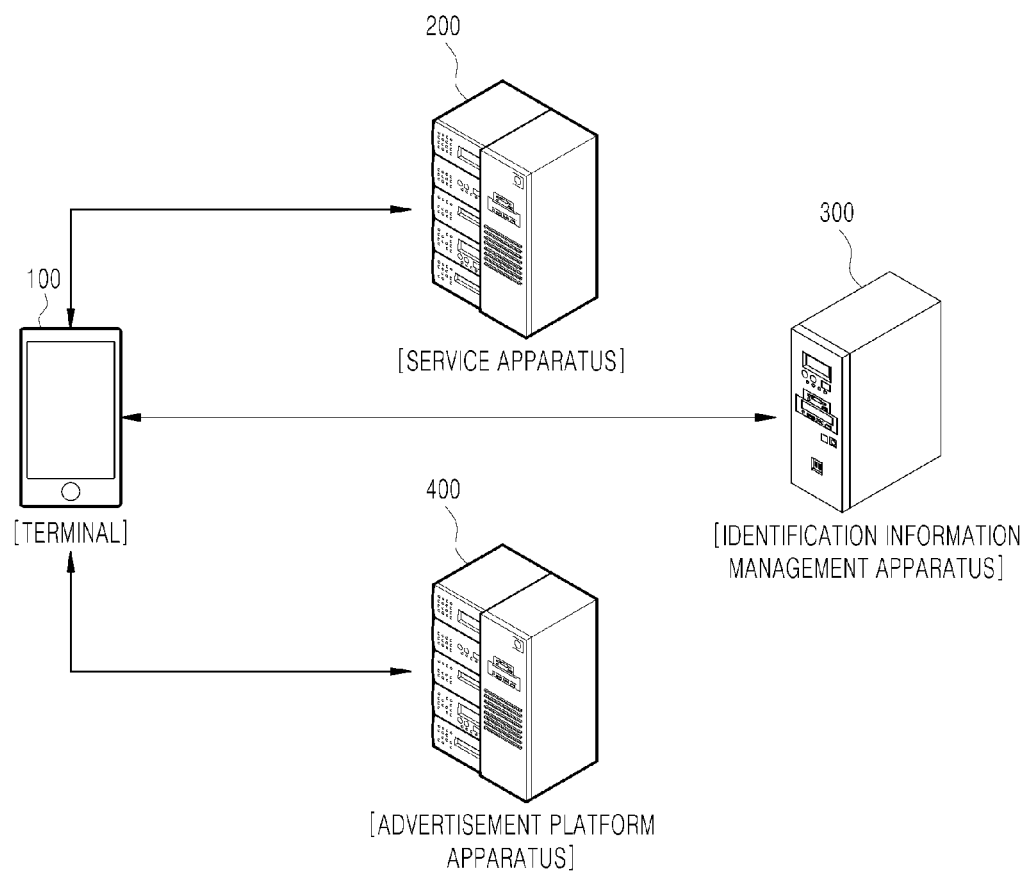
FIG. 1 is a schematic configuration diagram illustrating an advertisement providing system environment according to an embodiment of the present disclosure.

It is noted that the technical terms used herein are used only to describe specific embodiments and are not intended to limit the scope of the teachings disclosed herein. Also, the technical terms used herein should be interpreted in a sense that is generally understood by a person having ordinary skill in the art to which the presently disclosed technology belongs, unless the context clearly dictates otherwise and should not be construed in a broader sense or in an oversimplified sense. In addition, where technical terms used herein are inappropriate to exactly express the technical idea disclosed herein, they should be replaced with technical terms that allow the person in the art to properly understand. Also, the general terms used in the present disclosure should be interpreted in accordance with definitions in the dictionary and the predefined or prior context, and should not be construed as being excessively reduced in meaning.

As used herein, the singular form of "a," "an," and "the" include plural references unless the context clearly dictates otherwise. As used herein, the terms "consisting of," "comprising," etc., should not be construed as necessarily including all of the elements or steps listed thereafter, but some of the elements or steps may be omitted or additional elements or steps may further included.

Furthermore, the terms first, second and the like in the description and in the claims are used for distinguishing between similar elements and not necessarily for describing a sequential or chronological order. The terms are used only for distinguishing one component from another component. The terms so used are interchangeable under appropriate circumstances, e.g., a first component may be referred to as a second component and vice versa without departing from the scope of the present disclosure.

In the following detailed description, exemplary embodiments of the present disclosure will be described in detail with reference to the accompanying drawings. Throughout the drawings, like elements will be denoted by the same reference numerals and redundant descriptions will be omitted.

Detailed descriptions of well-known functions and structures incorporated herein will be omitted to avoid obscuring the gist of the technology disclosed herein. In addition, it is to be noted that the accompanying drawings are provided merely to facilitate understanding of the technical idea disclosed herein and that the scope of the technical idea is not limited thereby.

Hereinafter, an exemplary embodiment of the present disclosure will be described with reference to the accompanying drawings.

FIG. 1 is a schematic configuration diagram illustrating an advertisement providing system environment according to an embodiment of the present disclosure.

As shown in FIG. 1, an advertisement providing system environment according to an embodiment of the present disclosure includes a terminal 100 for receiving an advertisement and an advertisement platform apparatus 400 for providing an advertisement to the terminal 100.

In an embodiment of the present disclosure, the advertisement providing system environment may further include a service apparatus 200 for providing a service page (e.g., a web page) which the terminal 100 may access and an identification information management apparatus 300 for issuing terminal identification information in relation to access of the terminal 100 to the service page.

The terminal 100 refers to a mobile device capable of receiving advertisements through an advertisement medium and performing a series of operations such as accessing a service page related to an advertisement.

Examples of the terminal 100 may include a smart phone, a tablet PC, a PDA, or the like, and may include all devices capable of receiving advertisements through an advertisement medium and running a browser to access a service page. Here, an advertisement medium enabling the terminal 100 to receive an advertisement may correspond to, for example, an application executed in the terminal 100 itself or a service page which the terminal 100 access by calling a browser.

Such an advertisement medium includes a Software Development Kit (SDK) related to advertisement reception in the development process. Accordingly, the terminal 100 performing a series of operations of requesting, receiving, and displaying an advertisement through the SDK included in the advertisement medium.

In addition, the advertisement medium may support the function of collecting information performed in the advertisement platform apparatus 400 as well as the above-described series of operations of requesting, receiving and displaying an advertisement.

The terminal 100 collects various kinds of history information such as, for example, an advertisement selection history in an application or a service page, an application execution log, a service page access log, and service usage history information, and delivers the same to an advertisement platform apparatus 400. The advertisement platform apparatus 400 uses the delivered history information as advertisement selection information for the terminal 100.

In addition, the terminal 100 receives an advertisement through a Pull scheme, which is a method for the terminal 100 to make a request to the advertisement platform apparatus 400 for an advertisement and receive the advertisement using the terminal identification information issued thereto. However, the terminal 100 is not limited to the aforementioned scheme. It is apparent that the terminal 100 can receive an advertisement through a Push scheme of receiving an advertisement provided by the advertisement platform apparatus 400 without separately making an advertisement request to the advertisement platform apparatus 400.

The service device 200 refers to a web server (e.g., open market, shopping mall) that provides a service page which the terminal 100 can access through a browser.

For example, when the terminal 100 is connected through advertisement selection in the application, the service apparatus 200 allows the terminal 100 connected thereto to use various services (e.g., purchase of goods, sales, guidance, etc.) through the service page.

Then, when use of the service by the terminal 100 is completed, the service apparatus 200 may provide information on the service usage history of the terminal 100 (e.g., the purchased goods, the goods stored in the shopping cart, a product purchased by a user who has put the same item in a shopping cart, etc.) directly to the advertisement platform apparatus 400 or may provide the same to the advertisement platform apparatus 400 via the terminal 100, such that the information can be utilized as advertisement selection information.

The identification information management apparatus 300 refers to an issuance server that issues terminal identification information for receiving an advertisement in a service page provided from the service apparatus 200 when the terminal 100 accesses the service page.

The identification information management apparatus 300 issues terminal identification information in response to a request from the terminal 100, which is made when the terminal 100 accesses the service page, such that the terminal 100 can record the issued terminal identification information as a record information file (e.g., a cookie file) in the browser that the terminal 100 is using.

The advertisement platform apparatus 400 refers to an advertisement server that provides an advertisement registered by an advertiser to the terminal 100 according to an advertisement request received from the terminal 100.

The advertisement platform apparatus 400 collects various kinds of history information such as, for example, an advertisement selection history in an application or a service page provided in the terminal 100, an application execution log, a service page access log, and service usage history information, and stores the same as advertisement selection information for the terminal 100.

Finally, when the advertisement request is received from the terminal 100, the advertisement platform apparatus 400 selects a target advertisement for the terminal 100 using the advertisement selection information, and provide the selected advertisement to the terminal 100.

According to an embodiment of the present disclosure, the terminal 100 collects various pieces of log information according to execution of an application, which is an advertisement medium, or a service page (e.g., a web page), and delivers the same to the advertisement platform apparatus 400, and the advertisement platform apparatus 400 selects an advertisement for the terminal 100 by utilizing the log information transmitted from the terminal 100 as advertisement selection information.

In transmitting the log information or requesting the advertisement, the terminal 100 transmits the log information together with the terminal identification information, which is information for identifying the terminal 100 in the advertisement platform apparatus 400. The terminal identification information is issued differently by the same terminal 100 according to the type of the advertisement medium executed or accessed by the terminal 100.

For example, when an application is executed as an advertisement medium in the terminal 100, the application itself issues terminal identification information using device identification information (e.g., MDN, IMEI) of the terminal 100, stores the issued terminal identification information in a storage (e.g., an SD card) in the terminal 100 and manages the same.

Alternatively, when accessing a service page, which is another advertisement medium, through the browser, the terminal 100 generally requests the identification information management apparatus 300 to issue terminal identification information, and record and manage the terminal identification information issued by the identification information management apparatus 300 as a record information file (e.g., a cookie file) in the browser.

Although the terminal identification information issued according to execution of the application and the terminal identification information issued according to access to the service page are directed to the same terminal 100, they are substantially issued using different identifiers depending on the type of advertisement medium that the terminal 100 is using.

In particular, in the case of the terminal identification information issued when the terminal 100 accesses the service page, the terminal identification information may be issued using different identifiers depending on the type of the browser used by the terminal 100 to access the service page.

Accordingly, when the terminal 100 makes a request for an advertisement to the advertisement platform apparatus 400 using the terminal identification information or transmits the log information, the advertisement platform apparatus 400 receives, from the same terminal 100, the terminal identification information differently issued for each advertisement medium, and thus cannot confirm whether or not each received terminal identification information is issued to the same terminal 100.

As a result, collection and management of advertisement selection information for the terminal 100 is independently performed by the advertisement platform apparatus 400 for each type of advertisement media used by the terminal 100, and thus it is impossible for the advertisement media to share the collected and managed advertisement selection information among.

For example, when it is assumed that the terminal 100 executes an application as an advertisement medium and accesses a service page provided by the service apparatus 200 through advertisement selection in the application, the terminal 100 may transmit the service usage history information in the service page to the advertisement platform apparatus 400.

At this time, if the service usage history information received from the terminal 100 by the advertisement platform apparatus 400 can be utilized as the advertisement selection information for providing an in-application advertisement, a high-quality target advertisement may be expected to be provided for the terminal 100.

However, since the application installed in the terminal 100 and the service page which the terminal 100 accesses through the browser are different kinds of advertisement medium, the advertisement platform apparatus 400 manages the service usage history information by mapping the service usage history information to separate terminal identification information issued to the terminal 100 in association with the application.

Accordingly, the advertisement platform apparatus 400 cannot confirm whether the service usage history information is related to the advertisement in the application provided to the terminal 100 or the information generated for the terminal 100.

Thereby, although the service usage history information about the terminal 100 received from the service apparatus 200 is sufficiently valuable to be used for selecting an in-application advertisement for the terminal 100, the advertisement platform apparatus 400 cannot utilize the service usage history information as advertisement selection information for selecting an advertisement in an application.

In view of the above, in an embodiment of the present disclosure, a method of matching terminal identification information differently issued to the terminal 100 for each advertisement medium is proposed. Hereinafter, a terminal 100 and an identification information management apparatus 300 for implementing the method will be described in detail.

A detailed description of configuration of the terminal 100 according to an embodiment of the present disclosure will be given first with reference to FIG. 2

Figure 2:
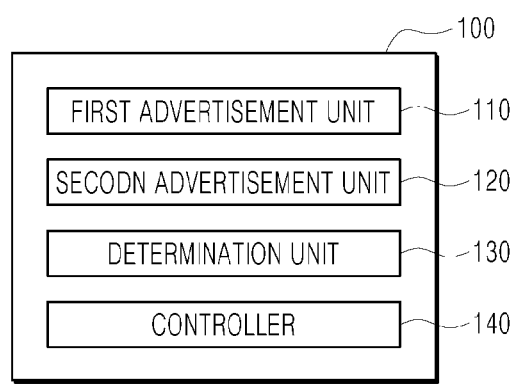
FIG. 2 is a schematic configuration diagram illustrating a terminal according to an embodiment of the present disclosure.

As shown in FIG. 2, the terminal 100 according to an embodiment of the present disclosure includes a first advertisement unit 110, a second advertisement unit 120, a determination unit 130 for determining whether or not an interface exists between the first advertisement unit 110 and the second advertisement unit 120, and a controller 140 for controlling the first advertisement unit 110 and the second advertisement unit 120 according to the result of determination performed by the determination unit 130.

Figure 3A:
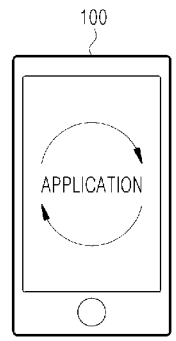
FIG. 3A illustrates a first advertisement unit in a terminal according to an embodiment of the present disclosure.

As shown in FIG. 3(a), the first advertisement unit 110 refers to an element for performing a series of operations related to an advertisement in connection with execution of an application, which is an advertisement medium. The first advertisement unit 110 may be the Software Development Kit (SDK) provided in the application.

Figure 3B:
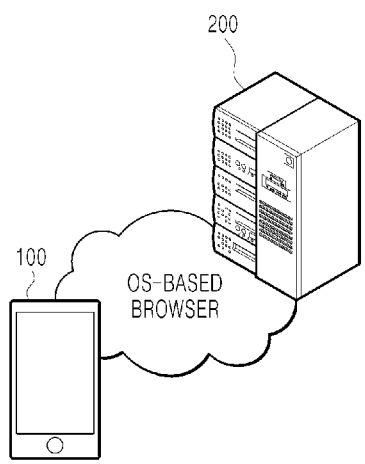
FIGS. 3B and 3C illustrate a second advertisement unit in a terminal according to an embodiment of the present disclosure.
Figure 3C:
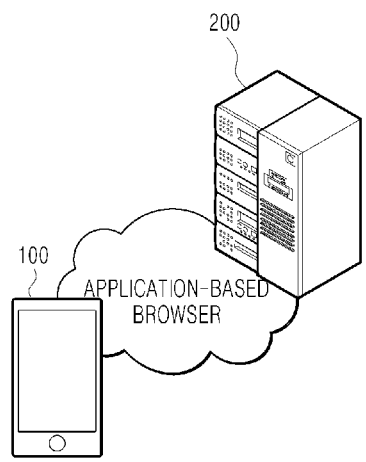

The second advertisement unit 120 is another advertisement medium. As shown in FIGS. 3(b) and 3(c), the second advertisement unit 120 refers to an element that performs a series of operations related to an advertisement when accessing a service page provided by the service apparatus 200. The second advertisement unit 120 may be a browser.

Here, when accessing a service page, a browser serving as the second advertisement unit 120 may read in the source code of the SDK inserted in the service page and perform a series of operations related to the advertisement.

For example, the browser serving as the second advertisement unit 120 may be an OS-based browser provided by an operating system (OS) of the terminal 100 as shown in FIG. 3(b) or an application-based browser provided by an application executed in the terminal 100 as shown in FIG. 3(c).

For reference, an application that can provide its own browser may be generally called a hybrid application (e.g., a mobile-dedicated shopping mall application).

In the case of the hybrid application, an interface with the browser provided by the hybrid application is formed. Through the interface, exchange of a variety of information including transmission of the access address information about the service page to be accessed by the hybrid application through the browser may be performed between the hybrid application and the application-based browser.

In contrast with the case of the hybrid application, a typical application and an OS-based browser provided by the operating system (OS) of the terminal 100 do not have an interface therebetween. Accordingly, it is not possible to perform exchange of additional information between an application and the OS-based browser except for transmitting, to the browser, the access address information on the service page to be accessed by the application through the browser.

All or at least a part of the elements of the terminal 100 including the first advertisement unit 110, the second advertisement unit 120, the determination unit 130 and the controller 140 described above may be implemented in the form of a software module executed by a processor, a hardware module, or a combination thereof.

The terminal 100 according to an embodiment of the present disclosure may match the terminal identification information that is issued with different identifiers for respective advertisement media using the aforementioned elements. Hereinafter, the elements in the terminal 100 will be described in detail.

It is assumed that the first advertisement unit 110 has issued first terminal identification information using when the first advertisement unit is an application executed in the terminal and the second advertisement unit is a browser provided in the application, determining that application, which is an advertisement medium, and stored the issued terminal identification information in a storage (e.g., an SD card) in the terminal 100 and that the second advertisement unit 120 has made a request to the identification information management apparatus 300 for issuance of terminal identification information, and records and manages second terminal identification information issued by the identification information management apparatus 300 as a record information file (e.g., a cookie file).

The determination unit 130 functions to determine whether an interface exists between the first advertisement unit 110 and the second advertisement unit 120.

More specifically, in the initial step for matching the terminal identification information, the determination unit 130 determines whether there is an interface between the first advertisement unit 110 and the second advertisement unit 120. The first advertisement unit 110 may correspond to an application that is an advertisement medium, and the second advertisement unit 120 may be a browser that is called to access a service page, which is another advertisement medium.

The determination unit 130 determines whether there is an interface between the first advertisement unit 110 and the second advertisement unit 120 by checking whether the browser serving as the second advertisement unit 120 is an application-based browser provided by the first advertisement unit 110 or an OS-based browser provided by the OS of the terminal 100.

If the browser serving as the second advertisement unit 120 is an application-based browser provided by the application serving as the first advertisement unit 110, the determination unit 130 determines that an interface exists between the first advertisement unit 110 and the second advertisement unit 120.

Here, the browser serving as the second advertisement unit 120 is an application-based browser, which may mean that the application serving as the first advertisement unit 110 is the hybrid application mentioned above.

If the browser serving as the second advertisement unit 120 is an OS-based browser which is provided by the OS of the terminal 100 and is irrelevant to the application serving as the first advertisement unit 110, the determination unit 130 determines that an interface exists between the first advertisement unit 110 and the second advertisement unit 120.

The controller 140 functions to control the first advertisement unit 110 and the second advertisement unit 120 according to the determination result of the determination unit 130.

More specifically, once the operation of determining whether there is an interface between the first advertisement unit 110 and the second advertisement unit 120 is completed, the controller 140 determines a method for controlling the first advertisement unit 110 and the second advertisement unit 120 based on the determination result and matches the first terminal identification information issued for the first advertisement unit 110 and the second terminal identification information issued for the second advertisement unit 120.

Here, the control method may include a first control method which is used when there is an interface between the first advertisement unit 110 and the second advertisement unit 120 and a second control method which is used when there is no interface between the advertisement units.

Hereinafter, the first advertisement unit 110 and the second advertisement unit 120 that operate according to the first control method and the second control method will be sequentially described.

According to the first control method, since there is an interface between the first advertisement unit 110 and the second advertisement unit 120, the first advertisement unit 110 can exchange various kinds of information including the access address information of the service page transmitted to the second advertisement unit 120.

Then, the second advertisement unit 120 may transmit second terminal identification information, which is issued from the identification information management apparatus 300 and recorded in a record information file, to the first advertisement unit 110 via the interface.

Then, when the second terminal identification information is received from the second advertisement unit 120 via the interface, the first advertisement unit 110 transmits, to the identification information management apparatus 300, the second terminal identification information and the first terminal identification information stored in a storage (e.g., an SD card) such that the identification information management apparatus 300 can match the first terminal identification information and the second terminal identification information with each other.

In this regard, the second terminal identification information issued for the second advertisement unit 120 is stored and managed in the identification information management apparatus 300 before the first terminal identification information and the second terminal identification information are received from the terminal 100.

When the first terminal identification information and the second terminal identification information are received from the terminal 100, the identification information management apparatus 300 verifies the second advertisement unit 120 of the terminal 100 to which the second terminal identification information has been issued, changes the second terminal identification information of the second advertisement unit 120 to the first terminal identification information, and manages the changed information.

In addition, if reconnection of the second advertisement unit 120 in the terminal 100 is confirmed after changing the second terminal identification information that has been issued to the second advertisement unit 120 to the first terminal identification information, the identification information management apparatus 300 allows the second advertisement unit 120 to newly record the changed first terminal identification information in the record information file.

Thereby, the first advertisement unit 110 and the second advertisement unit 120 in the terminal 100 may interoperate with the advertisement platform apparatus 400 using the first terminal identification information which is the same terminal identification information, rather than using different pieces of terminal identification information such as the first terminal identification information and the second terminal identification information.

Accordingly, the advertisement platform apparatus 400 may recognize the first advertisement unit 110 and the second advertisement unit 120, which use the first terminal identification information, as elements in the same terminal 100, and thus the advertisement selection information managed independently for the first advertisement unit 110 and the second advertisement unit 120 may be expected to be shared.

Next, according to the second control method, since there is no interface between the first advertisement unit 110 and the second advertisement unit 120, the first advertisement unit 110 cannot exchange any information except for the access address information of the service page, which the first advertisement unit 110 transmits to the second advertisement unit 120.

Accordingly, the first advertisement unit 110 transmits the first terminal identification information to the second advertisement unit 120 using the access address information of the service page.

That is, when access to the service page access is requested according to advertisement selection in the application, the first advertisement unit 110 may insert the first terminal identification information into the access address information of the service page as a parameter and transmit the same to the second advertisement unit 120.

When the first terminal identification information inserted into the access address information of the service page as a parameter is received, the second advertisement unit 120 transmits the first terminal identification information and the second terminal identification information recorded in the record information file together to the identification information management apparatus 300 such that the identification information management apparatus 300 can match the first terminal identification information and the second terminal identification information with each other.

At this time, similar to the first control method, the second terminal identification information issued for the second advertisement unit 120 is already stored and managed in the identification information managing apparatus 300 before the first terminal identification information and the second terminal identification information are received from the terminal 100.

When the first terminal identification information and the second terminal identification information are received from the terminal 100, the identification information management apparatus 300 verifies the second advertisement unit 120 in the terminal 100 to which the second terminal identification information has been issued, changes the second terminal identification information of the verified second advertisement unit 120 to the first terminal identification information and manages the first terminal identification information.

In addition, if reconnection of the second advertisement unit 120 in the terminal 100 is confirmed after change of the second terminal identification information issued to the second advertisement unit 120 to the first terminal identification information, the identification information management apparatus 300 allows the second advertisement unit 120 to newly record the changed first terminal identification information in the record information file.

Through the operations above, the first advertisement unit 110 and the second advertisement unit 120 in the terminal 100 may interoperate with the advertisement platform apparatus 400 using the first terminal identification information which is the same terminal identification information, rather than using different pieces of terminal identification information such as the first terminal identification information and the second terminal identification information. Accordingly, the advertisement platform apparatus 400 may recognize the first advertisement unit 110 and the second advertisement unit 120, which use the first terminal identification information, as elements in the same terminal 100, and thus the advertisement selection information managed independently for the first advertisement unit 110 and the second advertisement unit 120 may be expected to be shared and used.

As mentioned above, each of the elements of the terminal 100 may be implemented in the form of a software module executed by a processor, a hardware module, or a combination thereof.

As such, the software module executed by a processor, hardware module, or a combination thereof may be implemented in a hardware system (e.g., a computer system).

Hereinafter, a hardware system for implementing the terminal 100 according to an embodiment of the present disclosure will be described. It should be understood that the configuration described below is an example for implementing each element in the terminal 100, and each element and a corresponding operation may be different from an actual system.

Figure 4:
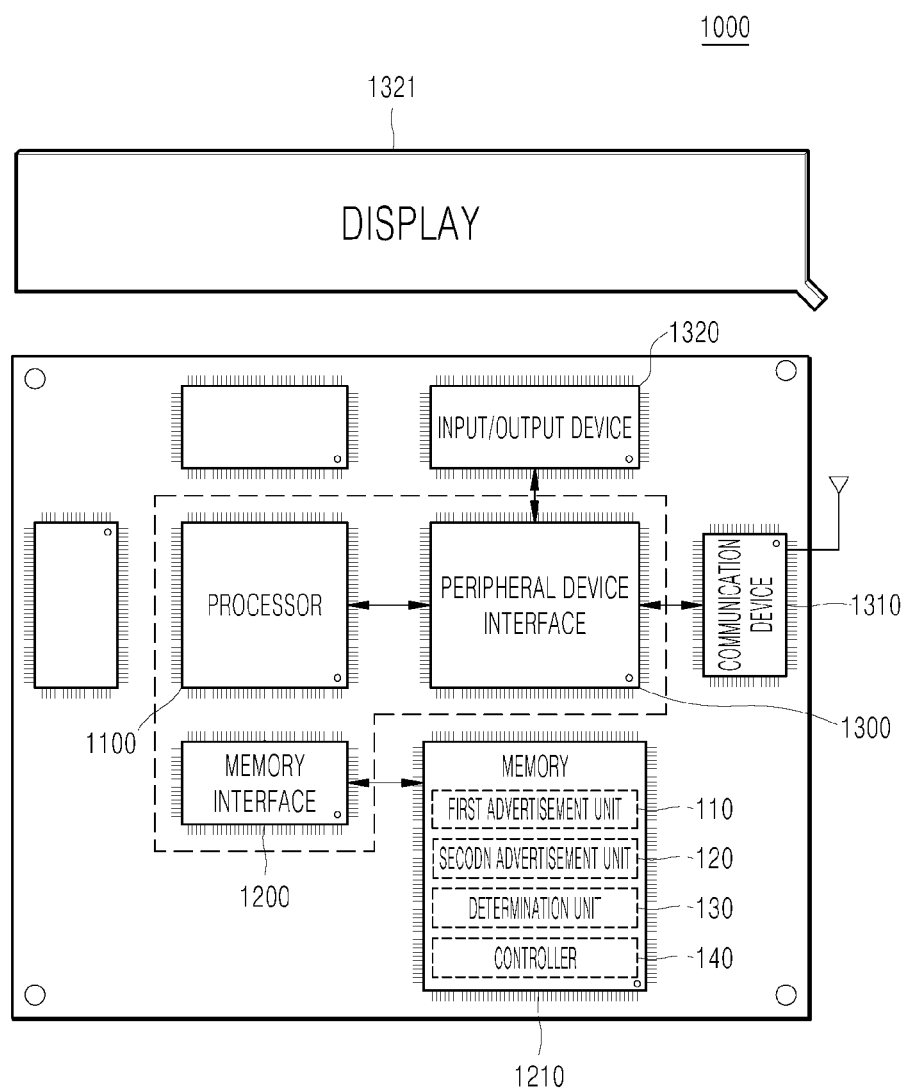
FIG. 4 is a schematic configuration diagram illustrating a hardware system for implementing a terminal according to an embodiment of the present disclosure.

FIG. 4 is a diagram illustrating the structure of a hardware system for implementing the terminal 100 according to an embodiment of the present disclosure.

As shown in FIG. 4, a hardware system 1000 according to an embodiment of the present disclosure may include a processor 1100, a memory interface 1200, and a peripheral device interface 1300.

Each of these elements in the hardware system 1000 may be an individual component or may be integrated into one or more integrated circuits. Each of these elements may be coupled to a bus system (not shown).

Here, the bus system is one or more individual physical buses, communication lines/interfaces, and/or multi-drop(s) connected by appropriate bridges, adapters, and/or controllers or an abstraction representing point-to-point connections.

The processor 1100 serves to execute various software modules stored in the memory 1210 by communicating with the memory 1210 via the memory interface 1200 to perform various functions in the hardware system.

Here, the first advertisement unit 110, the second advertisement unit 120, the determination unit 130, and the controller (not shown), which are elements provided in the terminal 100 and have been described with reference to FIG. 2, may be stored in the form of software modules in the memory 1210. An operating system may be additionally stored in the memory 1210.

The above operating system (e.g., an embedded operating system such as I-OS, Android, Darwin, RTXC, LINUX, UNIX, OS X, WINDOWS, or VxWorks) includes various procedures, a command set, software components and/or drivers for controlling and managing typical system operations (e.g., memory management, storage control, power management, etc.) and facilitates communication between various hardware modules and software modules.

For reference, the memory 1210 may include a memory hierarchy including, but not limited to, a cache, a main memory, and a secondary memory. The memory hierarchy may be implemented through any combination of, for example, RAM (e.g., SRAM, DRAM, DDRAM), ROM, FLASH, magnetic and/or optical storage devices (e.g., disk drives, magnetic tape, compact disk (CD) and digital video discs (DVD)).

The peripheral device interface 1300 serves to enable communication between the processor 1100 and a peripheral device.

The peripheral device is intended to provide different functions to the computer system. In an embodiment of the present invention, for example, a communication device 1310, an input/output device 1320 may be included in the peripheral device.

Here, the communication device 1310 performs a function of providing a communication function with another device. For example, the communication device 1310 may include, but not limited to, an antenna system, an RF transceiver, one or more amplifiers, a tuner, one or more oscillators, a digital signal processor, a codec (CODEC) chipset, and memory, and the like, and may include known circuitry that performs these functions.

Communication protocols supported by the communication device 1310 may correspond to protocols for, for example, Long Term Evolution (LTE), time division multiple access (TDMA), code division multiple access (CDMA), global system for mobile communications (GSM), Enhanced Data GSM Environment (EDGE), Wideband Code Division Multiple Access (W-CDMA), Wi-Fi (IEEE 802.11a, IEEE 802.11b, IEEE 802.11g and/or IEEE 802.11n, etc.), Bluetooth, Wi-MAX, Voice over Internet Protocol (VoIP), e-mail, instant messaging, and short message service (SMS) protocols, and may include all protocols for providing environments of communication with other devices.

The input/output device 1320 serves as a controller for controlling an I/O device operably connected with other hardware systems. In an embodiment of the present disclosure, the input/output device 1320 serves to control the display 1321 supporting display of an application execution screen, confirmation of selection of an advertisement in the application, display of a service connection screen, and the like.

When executed by the processor 1100, each element in the terminal 100, which is stored in the form of a software module in the memory 1210, may communicate with the communication device 1310 and the input/output device 1320 via the memory interface 1100 and the peripheral device interface 1300, thereby matching the first terminal identification information and the second terminal identification information with each other.

Hereinafter, each element in the hardware system 1000 related to the terminal 100 will be described in detail. For simplicity, each element of the terminal 100 stored in the form of software module in the memory 1210 is assumed to have been executed by the processor 1100.

The determination unit 130 determines whether there is an interface between the first advertisement unit 110 and the second advertisement unit 120.

More specifically, the determination unit 130 determines whether there is an interface between the first advertisement unit 110 and the second advertisement unit 120 by checking whether the browser serving as the second advertisement unit 120 is an application-based browser provided by the first advertisement unit 110 or an OS-based browser provided by the OS of the terminal 100.

If the browser serving as the second advertisement unit 120 is an application-based browser provided by the application serving as the first advertisement unit 110, the determination unit 130 determines that an interface exists between the first advertisement unit 110 and the second advertisement unit 120.

If the browser serving as the second advertisement unit 120 is an OS-based browser which is provided by the OS of the terminal 100 and is irrelevant to the application serving as the first advertisement unit 110, the determination unit 130 determines that an interface exists between the first advertisement unit 110 and the second advertisement unit 120.

The controller 140 functions to control the first advertisement unit 110 and the second advertisement unit 120.

More specifically, when the determination result of the determination unit 130 is received, the controller 140 determines a method for controlling the first advertisement unit 110 and the second advertisement unit 120 based on the determination result and matches the first terminal identification information issued for the first advertisement unit 110 and the second terminal identification information issued for the second advertisement unit 120.

Here, the control method may include a first control method which is used when there is an interface between the first advertisement unit 110 and the second advertisement unit 120 and a second control method which is used when there is no interface between the advertisement units.

Hereinafter, the first advertisement unit 110 and the second advertisement unit 120 operating in the hardware system 1000 according to the first control method and the second control method will be sequentially described.

According to the first control method, since there is an interface between the first advertisement unit 110 and the second advertisement unit 120, the first advertisement unit 110 can exchange various kinds of information including the access address information of the service page transmitted to the second advertisement unit 120.

Then, the second advertisement unit 120 transmits second terminal identification information, which is issued from the identification information management apparatus 300 and recorded in a record information file, to the first advertisement unit 110 via the interface.

In other words, when the second terminal identification information is received from the second advertisement unit 120 via the interface, the first advertisement unit 110 transmits, to the identification information management apparatus 300, the second terminal identification information, received by driving the communication device 1310 in the hardware system 1000, and the first terminal identification information stored in a storage (e.g., an SD card) such that the identification information management apparatus 300 can match the first terminal identification information and the second terminal identification information with each other.

Next, according to the second control method, since there is no interface between the first advertisement unit 110 and the second advertisement unit 120, the first advertisement unit 110 cannot exchange any information except for the access address information of the service page, which the first advertisement unit 110 transmits to the second advertisement unit 120.

If it is confirmed through the input/output device 1320 in the hardware system that an advertisement in the application is selected and access to the service page is requested, the first advertisement unit 110 inserts the first terminal identification information into the access address information of the service page as a parameter and transmits the same to the second advertisement unit 120.

Thereby, when the first terminal identification information inserted into the access address information of the service page as a parameter is received, the second advertisement unit 120 transmits, to the identification information management apparatus 300, the second terminal identification information, received by driving the communication device 1310 in the hardware system 1000, and the first terminal identification information stored in a storage (e.g., an SD card) such that the identification information management apparatus 300 can match the first terminal identification information and the second terminal identification information with each other.

Next, the configuration of the identification information management apparatus 300 according to an embodiment of the present disclosure will be described in more detail with reference to FIG. 5.

Figure 5:
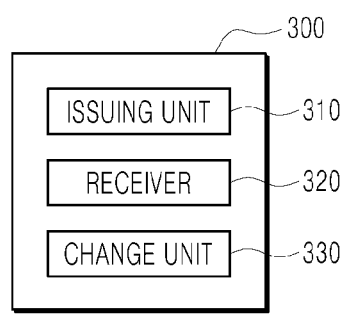
FIG. 5 is a schematic configuration diagram illustrating an identification information management apparatus according to an embodiment of the present disclosure.

As shown in FIG. 5, the identification information management apparatus 300 according to an embodiment of the present disclosure may include an issuing unit 310 for issuing second terminal identification information to the second advertisement unit (browser) 120 in the terminal 100, a receiver 320 for receiving the first terminal identification information issued for the first advertisement unit (application) 110 and the second terminal identification information in the terminal 100, and a change unit 330 for changing the second terminal identification information.

All or at least a part of the elements of the identification information management apparatus 300 including the issuing unit 310, the receiver 320 and the change unit 330 described above may be implemented in the form of a software module executed by a processor, a hardware module, or a combination thereof.

In other words, the identification information management apparatus 300 according to an embodiment of the present disclosure is capable of matching the first terminal identification information issued to the terminal 100 with the second terminal identification information using the aforementioned elements. Hereinafter, the elements in the identification information management apparatus 300 for implementing the match operation will be described in detail.

It is assumed that the first advertisement unit 110 in the terminal 100 has issued first terminal identification information using when the first advertisement unit is an application executed in the terminal and the second advertisement unit is a browser provided in the application, determining that application, which is an advertisement medium, and stored the issued terminal identification information in a storage (e.g., an SD card) in the terminal 100.

The issuing unit 310 performs a function of issuing second terminal identification information.

More specifically, when there is a request for issuance of identification information from the second advertisement unit 110 in the terminal 100 according to access of the terminal 100 to a service page connection, the issuing unit 310 may issue the second terminal identification information to the second advertisement unit 110 in the terminal 100 to allow the second advertisement unit 110 in the terminal 100 to record the second terminal identification information in a record information file.

Here, the second terminal identification information issued to the second advertisement unit 120 in the terminal 100 is stored and managed in a storage in the identification information management apparatus 300.

The receiver 320 receives the first terminal identification information and the second terminal identification information from the terminal 100.

More specifically, the receiver 320 receives the first terminal identification information and the second terminal identification information transmitted from the terminal 100 for the purpose of matching the terminal identification information.

If there is an interface between the first advertisement unit 110 and the second advertisement unit 120 in the terminal 100, the receiver 320 receives the first terminal identification information and the second terminal identification information through the first advertisement unit 110. If there is no interface between the first advertisement unit 110 and the second advertisement unit 120 in the terminal 100, on the other hand, the receiver 320 may receive the first terminal identification information and the second terminal identification information through the second advertisement unit 120.

The change unit 330 functions to match the first terminal identification information and the second terminal identification information issued to the terminal 100.

More specifically, when the first terminal identification information and the second terminal identification information are received from the terminal 100, the change unit 330 changes the second terminal identification information issued to the second advertisement unit 120 in the terminal 100 to the first terminal identification information received from the terminal 100, thereby matching the first terminal identification information with the second terminal identification information.

For example, referring to FIG. 6, when it is assumed that the first terminal identification information "A" and the second terminal identification information "W 1" are received from the terminal 100 in a situation where "W1" and "W2" are issued and managed as second terminal identification information for the second advertisement unit 120 in the terminal 100, the second terminal identification information "W1" may be changed to the first terminal identification information "A".

In addition, if reconnection of the second advertisement unit 120 in the terminal 100 is confirmed after change of the second terminal identification information issued to the second advertisement unit 120 to the first terminal identification information, the change unit 330 allows the second advertisement unit 120 in the terminal 100 to newly record the first terminal identification information in the record information file.

Through the operations above, the first advertisement unit 110 and the second advertisement unit 120 in the terminal 100 may interoperate with the advertisement platform apparatus 400 using the first terminal identification information which is the same terminal identification information, rather than using different pieces of terminal identification information such as the first terminal identification information and the second terminal identification information.

Accordingly, the advertisement platform apparatus 400 may recognize the first advertisement unit 110 and the second advertisement unit 120, which use the first terminal identification information, as elements in the same terminal 100, and thus the advertisement selection information managed independently for the first advertisement unit 110 and the second advertisement unit 120 may be expected to be shared and used.

As described above, according to the terminal 100 and the identification information management apparatus 300 according to an embodiment of the present disclosure, in providing an advertisement based on the terminal identification information issued to the terminal 100, the advertisement platform apparatus 400 may share the advertisement selection information independently collected and managed for each advertisement medium in association with the terminal 100 by matching the terminal identification information that is issued differently for each advertisement medium.

Figure 7:
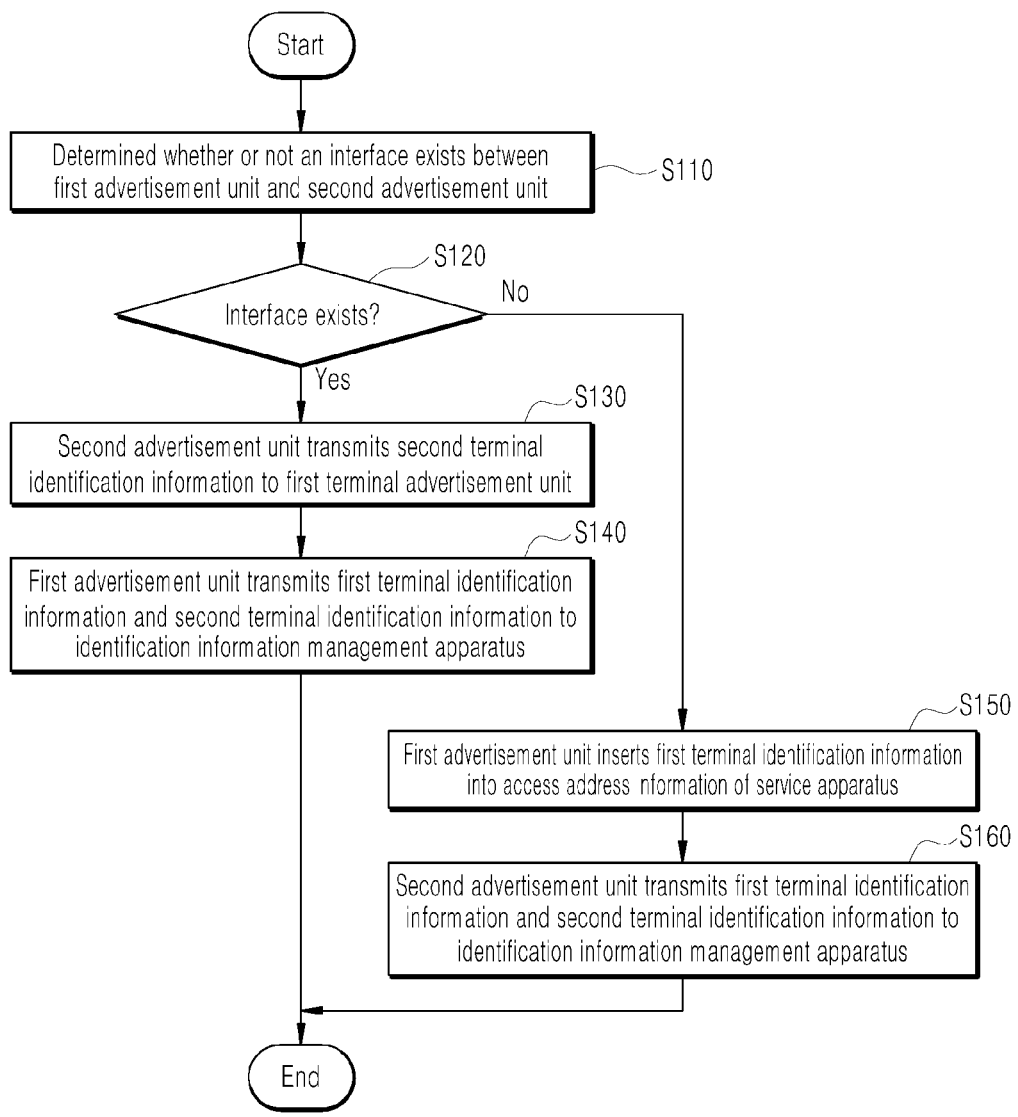
FIG. 7 is a flowchart illustrating flow of operations in a terminal according to an embodiment of the present disclosure.

Hereinafter, an operation flow in the terminal 100 according to an embodiment of the present disclosure will be described with reference to FIG. 7. For simplicity, the configurations shown in FIGS. 1 to 6 will be described with reference to the corresponding reference numerals.

It is assumed that the first advertisement unit 110 has issued first terminal identification information using when the first advertisement unit is an application executed in the terminal and the second advertisement unit is a browser provided in the application, determining that application, which is an advertisement medium, and stored the issued terminal identification information in a storage (e.g., an SD card) in the terminal 100 and that the second advertisement unit 120 has made a request to the identification information management apparatus 300 for issuance of terminal identification information in accordance with access to the service page, and records and manages second terminal identification information issued by the identification information management apparatus 300 as a record information file (e.g., a cookie file).

In the initial step for matching the terminal identification information, the determination unit 130 determines whether there is an interface between the first advertisement unit 110 and the second advertisement unit 120 (S110).

The determination unit 130 determines whether there is an interface between the first advertisement unit 110 and the second advertisement unit 120 by checking whether the browser serving as the second advertisement unit 120 is an application-based browser provided by the first advertisement unit 110 or an OS-based browser provided by the OS of the terminal 100.

If the browser serving as the second advertisement unit 120 is an application-based browser provided by the application serving as the first advertisement unit 110, the determination unit 130 determines that an interface exists between the first advertisement unit 110 and the second advertisement unit 120.

If the browser serving as the second advertisement unit 120 is an OS-based browser which is provided by the OS of the terminal 100 and is irrelevant to the application serving as the first advertisement unit 110, the determination unit 130 determines that an interface exists between the first advertisement unit 110 and the second advertisement unit 120.

Once the operation of determining whether there is an interface between the first advertisement unit 110 and the second advertisement unit 120 is completed, the controller 140 determines a method for controlling the first advertisement unit 110 and the second advertisement unit 120 based on the determination result and matches the first terminal identification information issued for the first advertisement unit 110 and the second terminal identification information issued for the second advertisement unit 120.

Here, the control method may include a first control method implemented through steps S120 to S140, and a second control method implemented through steps S120, S150 and S160.

According to the first control method, since there is an interface between the first advertisement unit 110 and the second advertisement unit 120, the first advertisement unit 110 can exchange various kinds of information including the access address information of the service page transmitted to the second advertisement unit 120.

Then, the second advertisement unit 120 transmits second terminal identification information, which is issued from the identification information management apparatus 300 and recorded in a record information file, to the first advertisement unit 110 via the interface (S120-S130).

Then, when the second terminal identification information is received from the second advertisement unit 120 via the interface, the first advertisement unit 110 transmits, to the identification information management apparatus 300, the second terminal identification information and the first terminal identification information stored in a storage (e.g., an SD card) such that the identification information management apparatus 300 can match the first terminal identification information and the second terminal identification information with each other (S140).

When the first terminal identification information and the second terminal identification information are received from the terminal 100, the identification information management apparatus 300 verifies the second advertisement unit 120 of the terminal 100 to which the second terminal identification information has been issued, changes the second terminal identification information of the second advertisement unit 120 to the first terminal identification information, and manages the changed information.

In addition, if reconnection of the second advertisement unit 120 in the terminal 100 is confirmed after changing the second terminal identification information that has been issued to the second advertisement unit 120 to the first terminal identification information, the identification information management apparatus 300 allows the second advertisement unit 120 to newly record the changed first terminal identification information in the record information file.

Next, according to the second control method, since there is no interface between the first advertisement unit 110 and the second advertisement unit 120, the first advertisement unit 110 cannot exchange any information except for the access address information of the service page, which the first advertisement unit 110 transmits to the advertisement unit 120.

Accordingly, when access to the service page access is requested according to advertisement selection in the application, the first advertisement unit 110 inserts the first terminal identification information into the access address information of the service page as a parameter and transmits the same to the second advertisement unit 120 (S120, S150).

When the first terminal identification information inserted into the access address information of the service page as a parameter is received, the second advertisement unit 120 transmits the first terminal identification information and the second terminal identification information recorded in the record information file together to the identification information management apparatus 300 such that the identification information management apparatus 300 can match the first terminal identification information and the second terminal identification information with each other (S160).

In this regard, when the first terminal identification information and the second terminal identification information are received from the terminal 100, the identification information management apparatus 300 verifies the second advertisement unit 120 in the terminal 100 to which the second terminal identification information has been issued, changes the second terminal identification information of the verified second advertisement unit 120 to the first terminal identification information and manages the first terminal identification information.

In addition, if reconnection of the second advertisement unit 120 in the terminal 100 is confirmed after change of the second terminal identification information issued to the second advertisement unit 120 to the first terminal identification information, the identification information management apparatus 300 allows the second advertisement unit 120 to newly record the changed first terminal identification information in the record information file.

Through the operations above, the first advertisement unit 110 and the second advertisement unit 120 in the terminal 100 may interoperate with the advertisement platform apparatus 400 using the first terminal identification information which is the same terminal identification information, rather than using different pieces of terminal identification information such as the first terminal identification information and the second terminal identification information.

As described above, according to the operation flow in the terminal 100 according to an embodiment of the present disclosure, in providing an advertisement based on the terminal identification information issued to the terminal 100, the advertisement platform apparatus 400 may share the advertisement selection information independently collected and managed for each advertisement medium in association with the terminal 100 by matching the terminal identification information that is issued differently for each advertisement medium.

The functional operations and implementations of the subject matter described herein may be implemented as digital electronic circuitry, or may be implemented in computer software, firmware, hardware, including the structures disclosed herein and structural equivalents thereof, or one or more combinations thereof. Implementations of the subject matter described herein may be implemented in one or more computer program products, in other words, one or more modules of computer program instructions encoded on a tangible program storage medium to control operation of a processing system or to be executed by the processing system.

The computer-readable medium may be a machine-readable storage device, a machine-readable storage substrate, a memory device, a composition of material that affects the machine-readable radio wave type signal, or one or more combinations thereof.

As used herein, "system" or "device" includes all kinds of apparatuses and machines for processing data including, for example, a programmable processor, a computer, a multiprocessor, or a computer. In addition to the hardware, the processing system may include, e.g., a code configuring processor firmware, and a code configuring an execution environment for the computer program upon request of, for example, a protocol stack, a database management system, an operating system, or one or more combinations thereof, or the like.

A computer program (also known as a program, software, a software application, a script or a code) may be written in any form of a programming language including a compiled or interpreted language, or a priori or procedural language, and may be deployed in any form including independent programs or modules, components, subroutines, or other units suitable for use in a computer environment. The computer program may not necessarily correspond to a file in a file system. The program may be stored in a single file provided to the requested program, in multiple interactive files (for example, a file storing one or more modules, subprograms or portions of a code), or in a part of a file (for example, one or more scripts stored in a markup language document) containing other programs or data. The computer program may be located on one site or distributed across multiple sites such that it is deployed to run on multiple computers interconnected by a communications network or on one computer.

The computer readable media suitable for storing computer program instructions and data may include, for example, semiconductor memory devices such as an EPROM, an EEPROM and flash memory devices, all sort of non-volatile memories including magnetic disks such as internal hard disks or external disks, and magnetic optical disks, CD-ROM and DVD-ROM disks, a media, and memory devices. A processor and a memory may be supplemented by special purpose logic circuits or integrated therewith.

Implementations of the subject matter described herein may be realized on an arithmetic system including, for example, a back-end component such as a data server, a middleware component such as an application server, a front-end component such as a client computer with a web browser or a graphical user interface allowing a user to interact with the implementations of the subject matter described herein, or one or more combinations of the back-end component, the middleware component, and the front-end component. The components of the system may be interconnected by any form or medium of digital data communications such as, for example, a communication network.

While the present disclosure includes a number of specific implementation details, they are not to be construed as limitations on any invention or the claimable scope. Rather, it should be understood as a description of features that may be specific to a particular embodiment of a particular invention. Similarly, the specific features described herein in the context of individual embodiments may be implemented in combination in a single embodiment. Alternatively, various features described in the context of a single embodiment may also be implemented in multiple embodiments individually or in any suitable sub-combination. Further, although the features may be described as operating in a particular combination and initially claimed as such, one or more features from the claimed combination may in some cases be excluded from the combination, and the claimed combination may be altered to a variant of a sub-combination or sub-combination.

Also, while the present disclosure illustrates operations in the drawings in a particular order, it should not be understood that such operations must be performed in that particular order or sequential order shown in the drawings in order to obtain a desired result, or that all illustrated operations should be performed. In certain cases, multitasking and parallel processing may be advantageous. Also, the separation of the various system components of the above described embodiments should not be understood as requiring such separation in all embodiments, and it should be understood that the program components and systems described above may generally be integrated together into a single software product or packaged into multiple software products.

As such, the present disclosure is not intended to limit the inventions to the specific terms disclosed herein. Thus, although the present disclosure has been described in detail with reference to the above examples, those skilled in the art would conceive alternations, modifications, and deformations on these examples without departing from the scope of the present disclosure. The scope of the present disclosure is defined by the appended claims rather than the description, and it should be construed that all alternations and modifications derived from the meaning and scope of the appended claims and their equivalents are included within the scope of the present disclosure.

The invention claimed is:
1. A system comprising:
a terminal including:

a first advertisement unit of a first application type that is configured to display advertisements, the first advertisement unit comprising a first terminal identification information;

a second advertisement unit of a second application type that is different from the first application type, the second advertisement unit configured to display the advertisements and comprising a second terminal identification information that is different from the first advertisement unit;

a determination unit configured to determine that an interface exists between the first advertisement unit and the second advertisement unit due to the second advertisement unit being provided by the first advertisement unit; and a controller configured to cause the first advertisement unit or the second advertisement unit to transmit the first terminal identification information and the second terminal identification information responsive to the determination unit determining that the interface exists between the first advertisement unit and the second advertisement unit, and an identification information management apparatus configured to receive the first terminal identification information and the second terminal identification information and responsive to the identification information management apparatus receiving the first terminal identification information and the second terminal identification information, the identification information management apparatus is configured to change the second terminal identification information of the second advertisement unit to match the first terminal identification information of the first advertisement unit, wherein responsive to the second terminal identification information being changed to match the first terminal identification information, the first advertisement unit and the second advertisement unit are configured to:

transmit the matching first terminal identification information or the second terminal identification information to an advertisement platform apparatus, and receive, from the advertisement platform apparatus, an advertisement selected based on the first terminal identification information or the second terminal identification information.

2. The system according to claim 1, wherein, when the first advertisement unit is an application executed in the terminal and the second advertisement unit is a browser provided in the application, the determination unit is configured to determine that the interface exists between the application and the browser.

3. The system according to claim 2, wherein, when the interface exists between the application and the browser, the controller is configured to cause the application to receive the second terminal identification information from the browser via the interface and to transmit the first terminal identification information and the second terminal identification information to the identification information management apparatus.

4. The terminal of claim 1, wherein the second advertisement unit is further configured to record the changed second terminal identification information that matches the first terminal identification information.

5. A method of operating a terminal having a first advertisement unit using first terminal identification information and a second advertisement unit using second terminal identification information independent of the first advertisement unit, the method comprising:

determining that an interface exists between the first advertisement unit and the second advertisement unit due to the second advertisement unit being provided by the first advertisement unit, the first advertisement unit of a first application type that is configured to display advertisements, and the second advertisement unit is of a second application type that is different from the first application type, the second advertisement unit configured to display the advertisements; and causing the first advertisement unit or the second advertisement unit to transmit the first terminal identification information and the second terminal identification information to an identification information management apparatus responsive to determining that the interface exists between the first advertisement unit and the second advertisement unit, wherein the identification information management apparatus changes the second terminal identification information of the second advertisement unit to match the first terminal identification information of the first advertisement unit responsive to the identification information management apparatus receiving the first terminal identification information and the second terminal identification information, responsive to the second terminal identification information being changed to match the first terminal identification information, transmitting the matching first terminal identification information or the second terminal identification information to an advertisement platform apparatus, and receiving, from the advertisement platform apparatus, an advertisement selected based on the first terminal identification information or the second terminal identification information.

6. The method according to claim 5, wherein determining that the interface exists comprises:

when the first advertisement unit is an application executed in the terminal and the second advertisement unit is a browser provided in the application, determining that the interface exists between the application and the browser.

7. The method according to claim 6, wherein causing the first advertisement unit or the second advertisement unit to transmit comprises:

causing the application to receive the second terminal identification information from the browser via the interface and to transmit the first terminal identification information and the second terminal identification information to the identification information management apparatus.

* * * * *